United States Patent
Friend et al.

(10) Patent No.: US 11,352,209 B2
(45) Date of Patent: Jun. 7, 2022

(54) REAR SUSPENSION MEMBER TRANSFER ASSEMBLIES AND METHODS

(71) Applicant: Toyota Motor Engineering & Manufacturing North America, Inc., Plano, TX (US)

(72) Inventors: Ronald Scott Friend, Jeffersonville, KY (US); Robert Aaron Allex, Ewing, KY (US); Brian McElroy, Winchester, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 539 days.

(21) Appl. No.: 16/455,861

(22) Filed: Jun. 28, 2019

(65) Prior Publication Data
US 2020/0407163 A1    Dec. 31, 2020

(51) Int. Cl.
*G06F 7/00* (2006.01)
*B65G 1/137* (2006.01)
*B62D 25/08* (2006.01)
*B62D 21/11* (2006.01)
*B60G 21/05* (2006.01)

(52) U.S. Cl.
CPC ......... *B65G 1/1373* (2013.01); *B60G 21/052* (2013.01); *B62D 21/11* (2013.01); *B62D 25/08* (2013.01)

(58) Field of Classification Search
USPC ................................. 700/213–214, 228, 230
See application file for complete search history.

(56) References Cited

U.S. PATENT DOCUMENTS

| | | | | |
|---|---|---|---|---|
| 5,272,805 A | * | 12/1993 | Akeel | G05B 19/41805 29/771 |
| 5,577,597 A | * | 11/1996 | Kakida | B65G 37/02 198/346.2 |
| 6,145,180 A | * | 11/2000 | Kogai | B62D 65/02 29/430 |
| 6,739,031 B2 | | 5/2004 | Shimizu | |

(Continued)

FOREIGN PATENT DOCUMENTS

CN    203997873 U    12/2014
JP    2006264585 A    10/2006

OTHER PUBLICATIONS

CIMCORP, Car manufacturing—streamline your assembly line, https://www.cimcorp.com/car-manufacturing-assembly-line, Accessed Feb. 25, 2019.

*Primary Examiner* — Yolanda R Cumbess
(74) *Attorney, Agent, or Firm* — Dinsmore & Shohl LLP

(57) ABSTRACT

A rear suspension member (RSM) transfer assembly for transferring an RSM from a sub-assembly line to a main assembly line includes a first RSM lifter, an RSM buffer, and a second RSM lifter. The first RSM lifter is configured to travel laterally between the sub-assembly line and the main assembly line. The first RSM lifter includes a lifting body and a rotatable arm configured to retrieve the RSM from the sub-assembly line and transport the RSM to the main assembly line. The RSM buffer is configured to receive the RSM from the first RSM lifter and transport the RSM through a plurality of resting positions. The second RSM lifter is configured to receive the RSM from the RSM buffer and raise the RSM into position for installation on a vehicle.

14 Claims, 10 Drawing Sheets

(56) References Cited

U.S. PATENT DOCUMENTS 9,760,086 B2 9/2017 Woodtli et al.
9,988,212 B2* 6/2018 Yamashita ........... B65G 1/1373
2001/0054535 A1* 12/2001 Faitel ................. B65G 49/0463
198/346.3

* cited by examiner

US 11,352,209 B2

REAR SUSPENSION MEMBER TRANSFER ASSEMBLIES AND METHODS

TECHNICAL FIELD

The present specification generally relates to transfer assemblies for transferring a subcomponent of a vehicle from a sub-assembly line to a main assembly line and, more specifically, to methods and assemblies for transferring a rear suspension member from a sub-assembly line to a main assembly line.

BACKGROUND

During manufacture of a vehicle, the rear suspension member (RSM) may be maneuvered from a sub-assembly line to the main assembly line. Conventionally, such maneuvering may be achieved using two floor-mounted arms (Arnold Arms) and RSM transfer dollies. However, such systems are limited as they may not provide a buffer between the sub-assembly line and the main assembly line. That is, main assembly line operations may be held up during transfer of the RSM to the main assembly line waiting for the next RSM to be transferred, which may be compounded due to downtime on the sub-assembly line.

Accordingly, a need exists for alternative assemblies and methods for transferring a rear suspension member from the sub-assembly line to the main assembly line that alleviates downtime in assembly.

SUMMARY

In one embodiment, a rear suspension member (RSM) transfer assembly for transferring an RSM from a sub-assembly line to a main assembly line includes a first RSM lifter, an RSM buffer, and a second RSM lifter. The first RSM lifter is configured to travel laterally between the sub-assembly line and the main assembly line. The first RSM lifter includes a lifting body and a rotatable arm configured to retrieve the RSM from the sub-assembly line and transport the RSM to the main assembly line. The RSM buffer is configured to receive the RSM from the first RSM lifter and transport the RSM through a plurality of resting positions. The second RSM lifter is configured to receive the RSM from the RSM buffer and raise the RSM into position for installation on a vehicle.

In another embodiment, a method of transporting a rear suspension member (RSM) from a sub-assembly line to a main assembly line includes retrieving the RSM from the sub-assembly line with a first RSM lifter, transporting the RSM with the first RSM lifter to an RSM buffer, transporting the RSM through a plurality of resting positions with the RSM buffer, receiving the RSM from the RSM buffer with a second RSM lifter, and lifting the RSM with the second RSM lifter into position for installation on a vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2I depicts an RSM being installed on a vehicle, according to one or more embodiments shown and described herein.

DETAILED DESCRIPTION

The figures generally depict a vehicle manufacturing assembly. The vehicle manufacturing assembly may include a main assembly line and a sub-assembly line. The sub-assembly line may be for assembling subcomponents of a vehicle, such as rear suspension members (hereinafter "RSMs"). The vehicle manufacturing assembly may include an RSM transfer assembly for transferring RSMs from the sub-assembly line to the main assembly line. The RSM transfer assembly may include a first RSM lifter, an RSM buffer, and a second RSM lifter. The first RSM lifter may be configured to travel laterally between the sub-assembly line and the main assembly line. The first RSM lifter may include a lifting body and a rotatable arm configured to retrieve an RSM from the sub-assembly line and transport the RSM to the main assembly line. The RSM buffer may be configured to receive the RSM from the first RSM lifter and transport the RSM through a plurality of resting positions. The second RSM lifter is configured to receive the RSM from the RSM buffer and raise the RSM into position for installation on a vehicle. The RSM transfer assembly may allow for continuous assembly of an RSM to a passing vehicle body due to the store of the RSMs maintained on the RSM buffer. Accordingly, downtime due to awaiting retrieval of an RSM from the sub-assembly line may be avoided.

Figure 1:
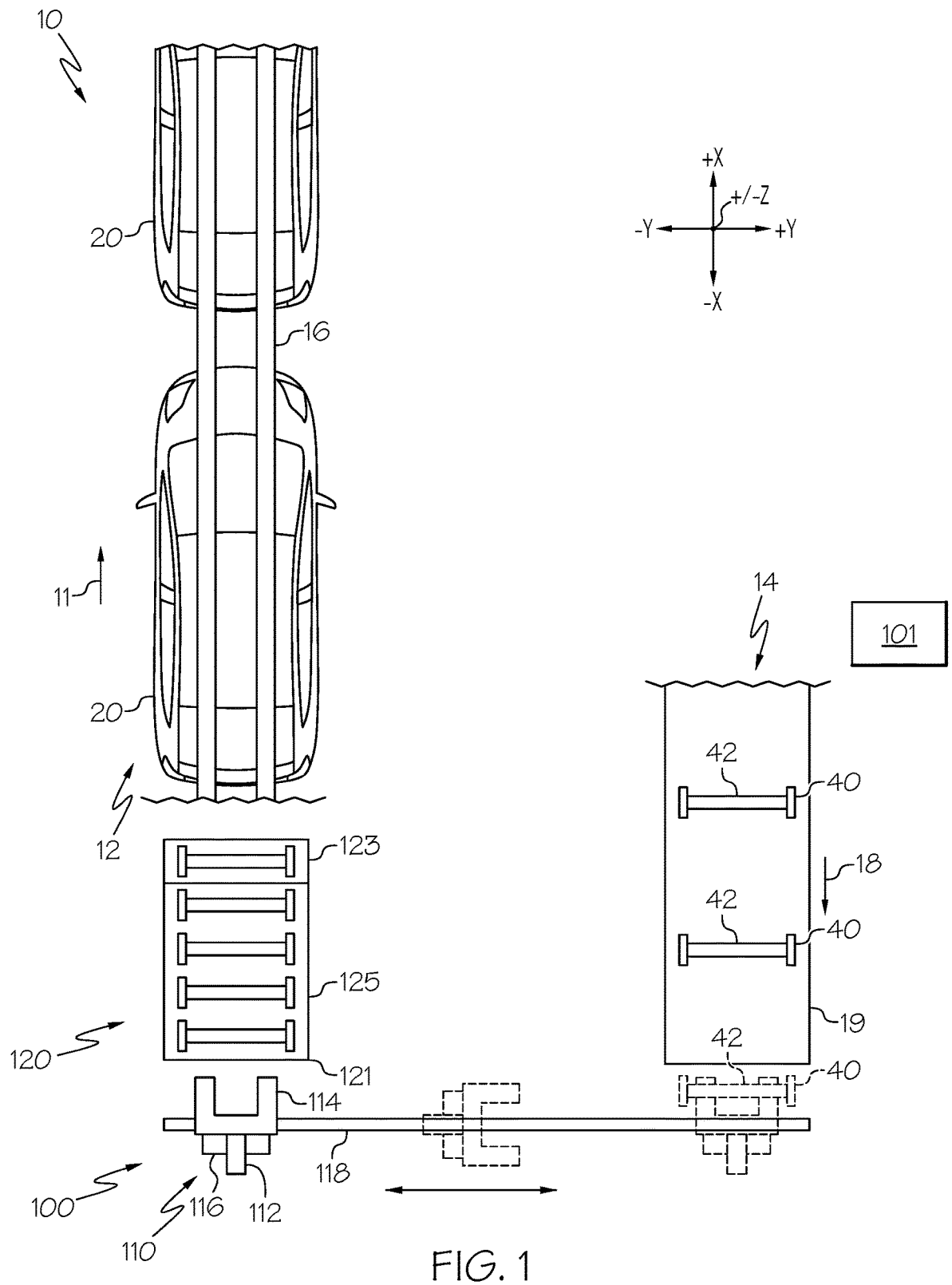
FIG. 1 schematically depicts an plan view of a vehicle assembly line with a portion of a main assembly line cut away to display a rear suspension member (RSM) transfer assembly, according to one or more embodiments shown and described herein.
Figure 2A:
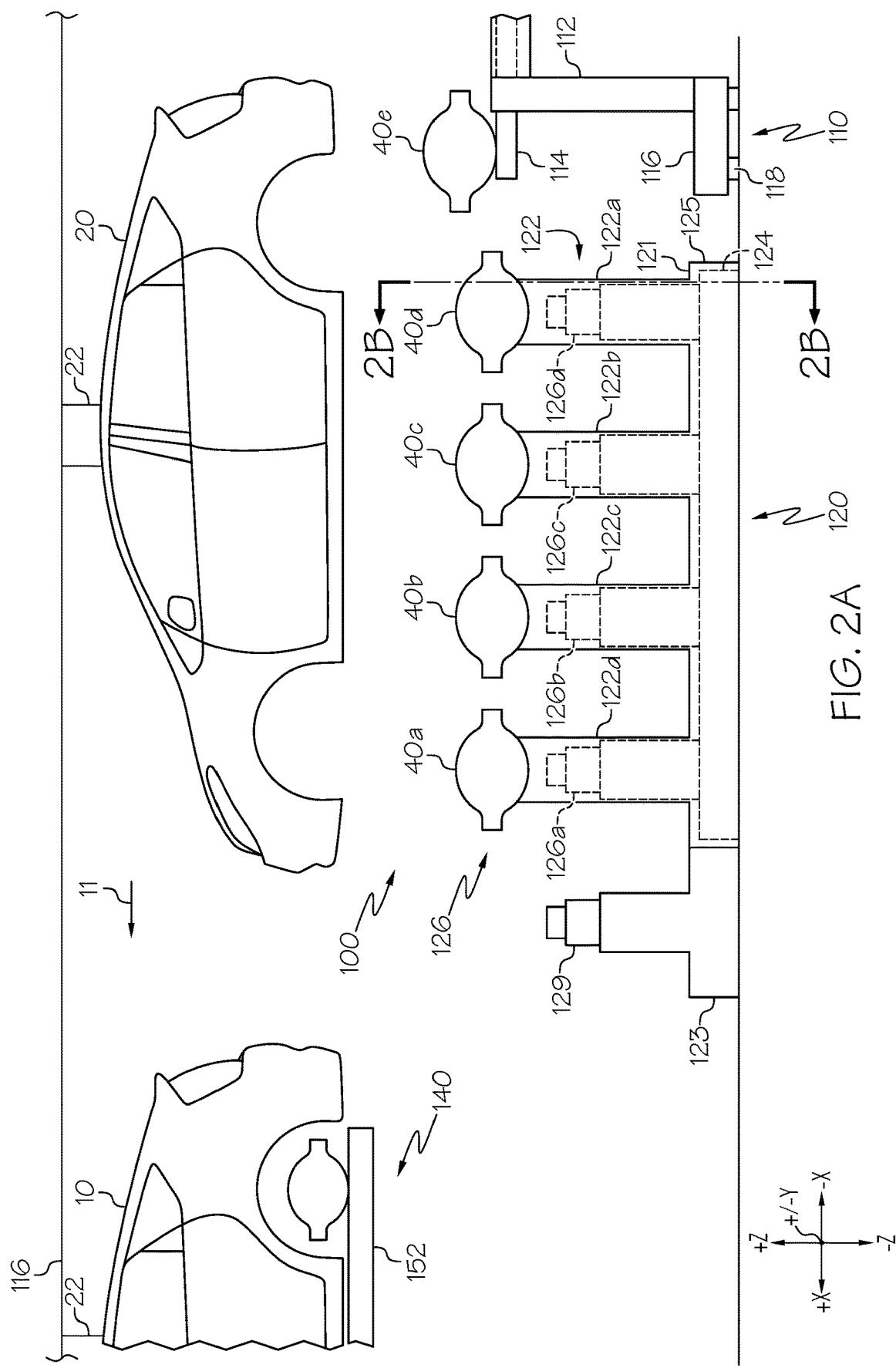
FIG. 2A schematically depicts a side elevation view of the RSM transfer assembly of FIG. 1, according to one or more embodiments shown and described herein.

Referring now to FIG. 1, a vehicle manufacturing assembly 10 is generally depicted. The vehicle manufacturing assembly 10 includes a main assembly line 12 and a sub-assembly line 14. The main assembly line 12 may include an overhead conveyor 16 for conveying vehicle bodies through various processing stations for assembling components to the vehicle 20. For example, a vehicle 20 may be coupled to the overhead conveyor 16 through a clamp 22 (such as illustrated in FIG. 2A) or similar device and conveyed along a main assembly line conveyance direction 11. In the illustrated embodiment, a portion of the main assembly line 12 is cut away to illustrate portions of the RSM transfer assembly 100 over which the main assembly line 12 may travel.

The sub-assembly line 14 may include a conveyor 19 or similar device that conveys an RSM 40 through various processing stations for assembly of components to a frame 42 of the RSM 40. As used herein an RSM refers to one or more components of a vehicle's rear suspension system. The RSM 40 may include linkages, shock absorbers, wheels, springs, or a combination thereof. The RSM 40 is schematically depicted in the figures as generally including a frame 42 to which various components of the RSM 40 may be attached. Any number of components of the RSM 40 may be attached to the frame 42 prior to installation on a vehicle 20. It is noted that while the present embodiments are directed to the installation of an RSM, in certain embodiments, similar transfer systems may be used for other vehicle components (e.g., a front suspension member) that are transferred from a sub-assembly line 14 and coupled to a vehicle 20 traveling along a main assembly line 12.

The main assembly line 12 may include a main assembly line conveyance direction 11 in which a vehicle 20 is conveyed. The main assembly line conveyance direction 11 may be parallel to the sub-assembly line conveyance direction 18 as depicted in FIG. 1. However, is contemplated that the sub-assembly line conveyance direction 18 may travel along a non-zero angle with respect to the main assembly line conveyance direction 11.

The vehicle manufacturing assembly 10 further includes an RSM transfer assembly 100 for transporting an RSM 40 from the sub-assembly line 14 to the main assembly line 12. The RSM transfer assembly 100 may generally include a control unit 101, a first RSM lifter 110, an RSM buffer 120, a second RSM lifter 140 (show in FIG. 2A), or combinations thereof. It is noted that additional components may be included without departing from the scope of the present disclosure.

The control unit 101 may be communicatively coupled to the various components of the RSM transfer assembly 100 to facilitate movement of the RSM 40 through the RSM transfer assembly 100. For example, the control unit 101 may include a processor and a non-transitory memory storing logic, such as computer readable and executable instructions that, when executed by the processor causes the RSM transfer assembly 100 to transfer the RSM 40 from the main assembly line 12 to the sub-assembly line 14, transfer the RSM 40 through a plurality of resting positions 122 of the RSM buffer 120, and/or install the RSM 40 into the vehicle 20. Accordingly, the control unit 101 may control motion of the first RSM lifter 110, the RSM buffer 120, and the second RSM lifter 140 as will be described in greater detail herein.

The first RSM lifter 110 may be configured to travel between the sub-assembly line 14 and the main assembly line 12. For example, and as illustrated in FIG. 1, the first RSM lifter 110 may travel laterally (e.g., in a direction transverse to the conveyance direction of the main assembly line 12) between the sub-assembly line 14 and the main assembly line 12. Referring collectively to FIGS. 1 and 2A-2D, the first RSM lifter 110 may include a lifting body 112 and a rotatable arm 114 coupled to the lifting body 112. The lifting body 112 may be coupled to a base 116. The lifting body 112 may facilitate a lifting and lowering motion of the rotatable arm 114 in the Z-direction of the depicted coordinate axes relative to the base 116. For example, the lifting body 112 may include an actuator (not shown) configured to lift and lower the rotatable arm 114. Such actuators may include, but are not limited to, electromechanical actuators, pneumatic actuators, hydraulic actuators, or the like.

To facilitate motion between the main assembly line 12 and the sub-assembly line 14, the RSM transfer assembly 100 may further include a lateral motion track 118. The first RSM lifter 110 may engage with the lateral motion track 118 and travel along the lateral motion track 118 between the main assembly line 12 and the sub-assembly line 14. An actuator (not shown) communicatively coupled to the control unit 101 may allow the control unit 101 to move the first RSM lifter 110 between the main assembly line 12 and the sub-assembly line 14. Such actuators may include motorized wheels, belts, pulleys, linear actuators, or the like. FIG. 1 generally depicts motion of the first RSM lifter 110 along the lateral motion track 118, to retrieve an RSM 40 from the sub-assembly line 14.

The rotatable arm 114 may be configured to rotate around a vertical axis parallel to the Z-direction of the depicted coordinate axes. To facilitate rotation, the rotatable arm 114, the lifting body 112, and/or the base 116 may be coupled to a rotation actuator (not shown) for causing rotation of the rotatable arm 114. For example, the entirety of the first RSM lifter 110 may rotate, as illustrated in FIG. 1, or only a portion 123 thereof. Rotation actuators may include rotary actuators such as stepper motors, servo motors, or the like.

As illustrated in FIGS. 2A-2D, the rotatable arm 114 may be configured for extension/retraction along the X-direction of the depicted coordinate axes. Extension and retraction motion may be facilitated by an actuator (not shown) communicatively coupled to the control unit 101. The extension and retraction motions may allow the rotatable arm 114 to extend to retrieve an RSM 40 from the sub-assembly line 14, and/or deposit the RSM 40 on the RSM buffer 120. Such actuators may include, but are not limited to, electromechanical linear actuators, pneumatic linear actuators, hydraulic linear actuators, or the like.

Motion of the first RSM lifter 110 will now be described. In particular, FIG. 1 schematically depicts the rotatable arm 114 of the RSM 40 lifter being rotated (e.g., 90 degrees relative to the main assembly line conveyance direction 11) and traveling over the lateral motion track 118 to the sub-assembly line 14. Once at the sub-assembly line 14, the first RSM lifter 110 may rotate the rotatable arm 114 to extend in a direction parallel to the sub-assembly line conveyance direction 18 or in any direction, which allows the first RSM lifter 110 to retrieve the RSM 40 from the sub-assembly line 14. Once in position, the RSM lifter 110 may extend and align the rotatable arm 114 under a frame 42 of the RSM 40 and lift the rotatable arm 114 with the lifting body 112 to pick up the RSM 40 from the sub-assembly line 14. The first RSM lifter 110 may then retract the rotatable arm 114 while supporting the RSM 40. At such point, the RSM 40 lifter may lower the rotatable arm 114, rotate 90 degrees relative to the main assembly line conveyance direction 11, and traverse the lateral motion track 118 to the RSM buffer 120, wherein the first RSM lifter 110 may extend the rotatable arm 114 and lower the RSM 40 (e.g., RSM 40e) to a first resting position 122a of the RSM buffer 120, as illustrated in FIGS. 2A-2I.

The RSM buffer 120 is configured to receive the RSM 40 (e.g., RSM 40e) from the first RSM lifter 110 and transport the RSM 40 through a plurality of resting positions 122 (e.g., resting positions 122a, 122b, 122c, and 122d). The RSM buffer 120 may include a shuttle frame 121, a shuttle 124 moveable along the shuttle frame 121, and one or more lifting arms 126 (e.g., lifting arms 126a, 126b, 126c, and 126d) coupled to the shuttle 124.

Figure 2B:
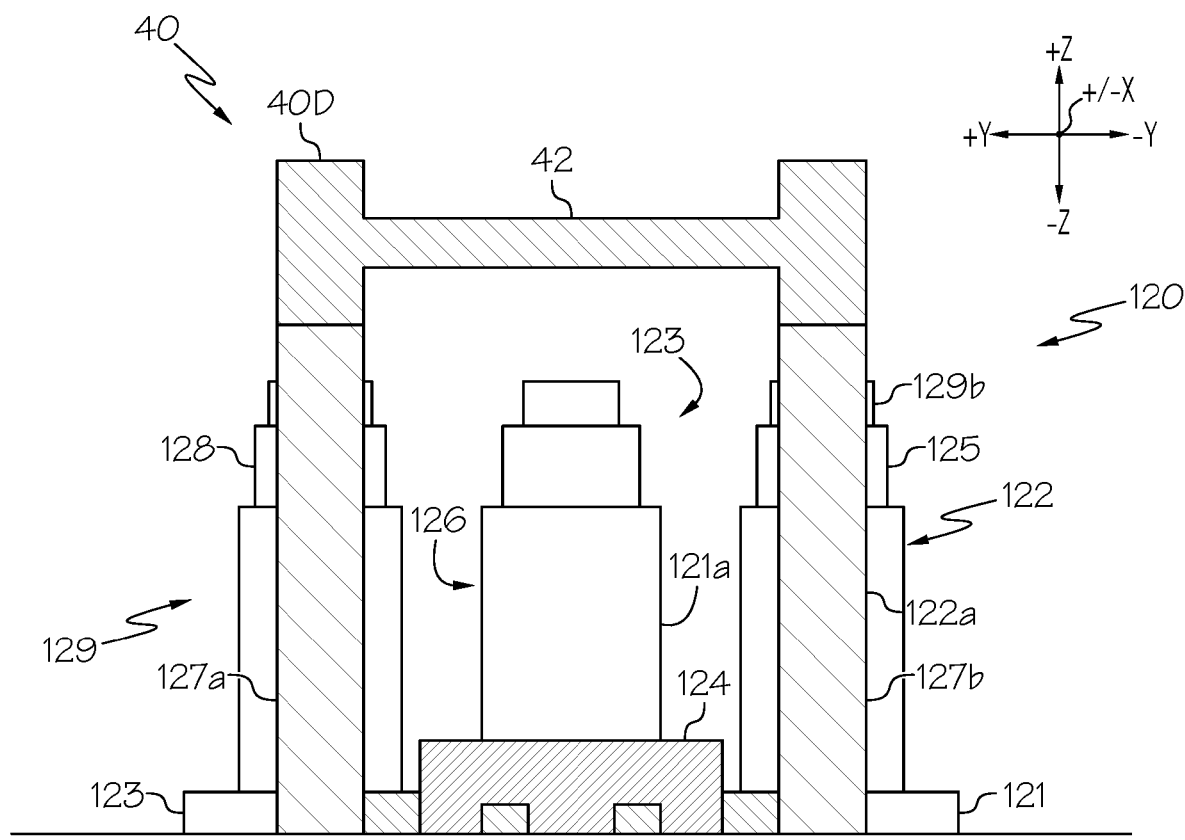
FIG. 2B schematically depicts a cross-section along line 2B-2B of FIG. 2A of an RSM Buffer, according to one or more embodiments shown and described herein.

The shuttle frame 121 may include a stationary portion 125 and a transfer portion 123 moveable relative to the stationary portion 125. The stationary portion 125 of the shuttle frame 121 defines the plurality of resting positions 122. The resting positions 122 may be any structure configured to support an RSM thereon (e.g., a metal, wood, and/or plastic frame). The resting positions 122 may be equidistantly spaced along the length of the stationary portion in the X direction of the depicted coordinate axes. Each resting position 122 may be the same height as the adjacent resting positions. FIG. 2B illustrates a cross-section of the RSM Buffer 120. In the illustrated embodiment, the stationary portion 125 and the plurality of resting positions 126 define a cradle through which the shuttle 124 travels. That is each resting position 122 may have a first support side 127a and a second support side 127b, upon which an RSM (e.g., RSM 40d) may sit. Referring again to FIG. 2A, the plurality of resting positions 122 are configured to support an RSM 40 thereon before the shuttle 124 shifts the RSM 40 to a subsequent resting position or to the transfer portion 123. For example, the plurality of resting positions 122 may include a first resting position 122a, a second resting position 122b, a third resting position 122c, and a fourth resting position 122d. It is contemplated that the shuttle frame 121 may define a greater or fewer number of resting positions without departing from the scope of the present disclosure. When depositing the RSM 40e onto the shuttle frame 121, the first RSM lifter 110 may deposit the RSM 40e onto the first resting position 122a.

Figure 2C:
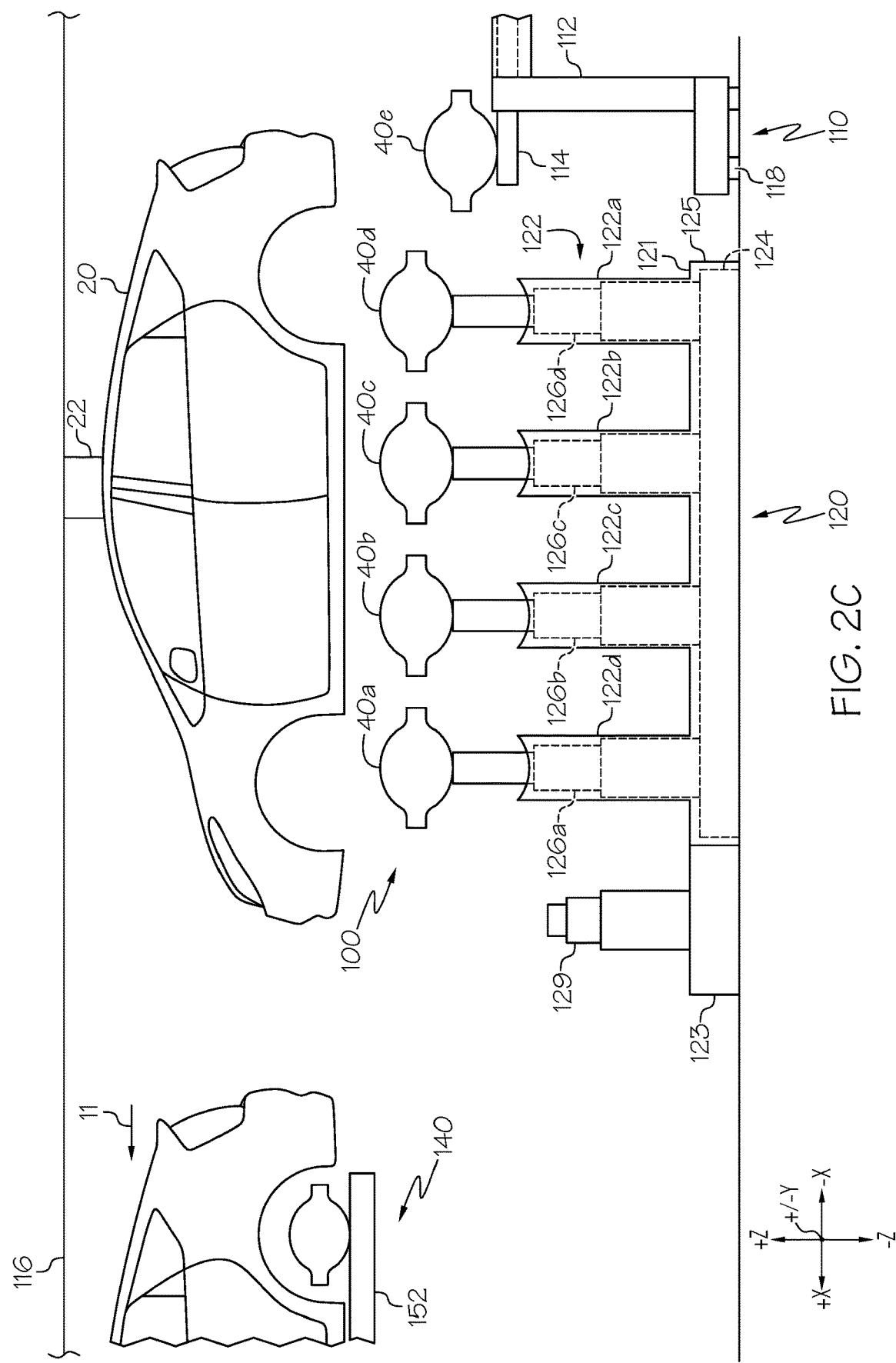
FIG. 2C schematically depicts the RSM buffer positioning a plurality of RSMs in a transport orientation with a plurality of lifting arms, according to one or more embodiments shown and described herein.
Figure 2D:
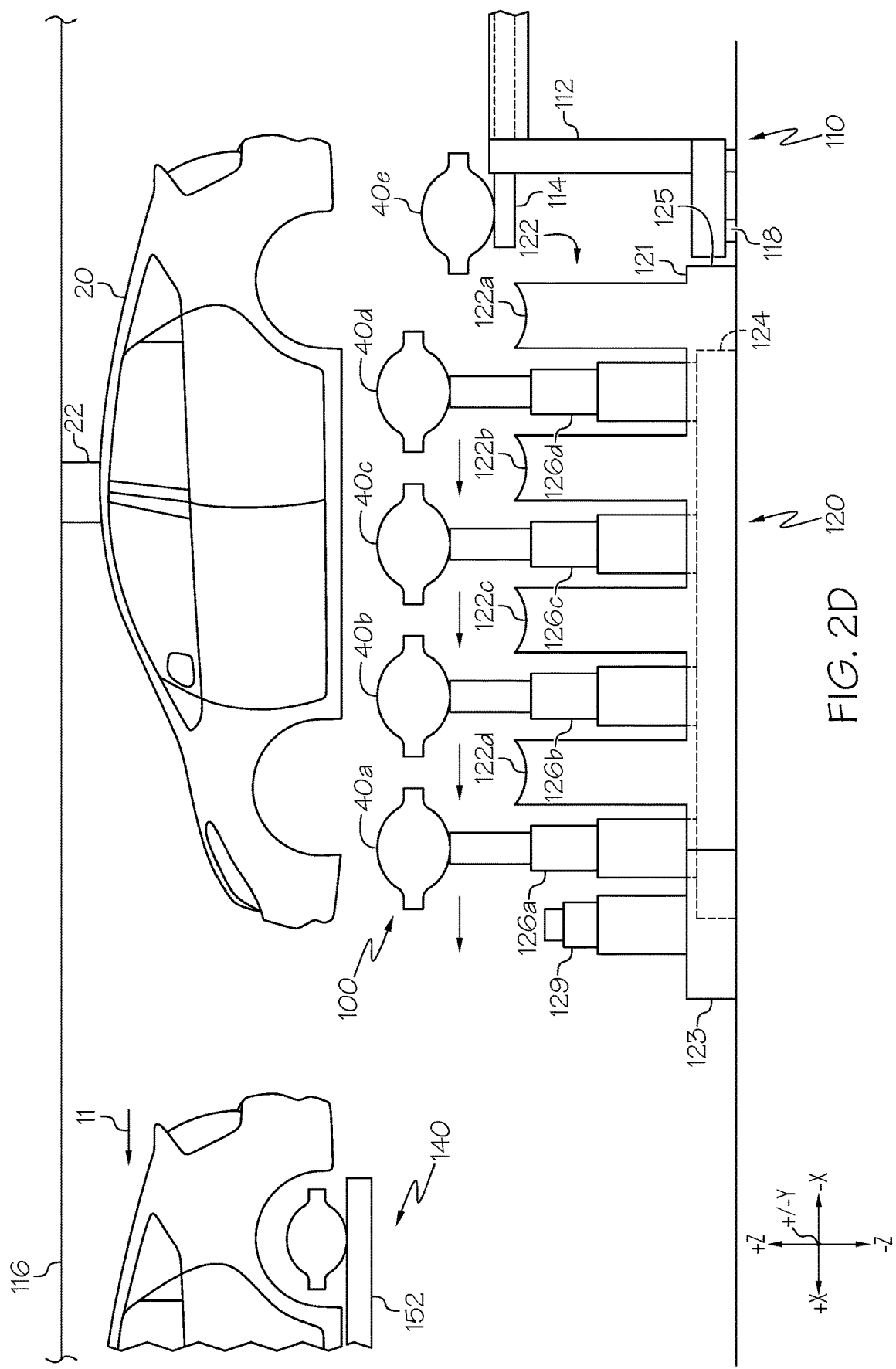
FIG. 2D schematically depicts transfer of the plurality of RSMs with the plurality of lifting arms, according to one or more embodiments shown and described herein.
Figure 2E:
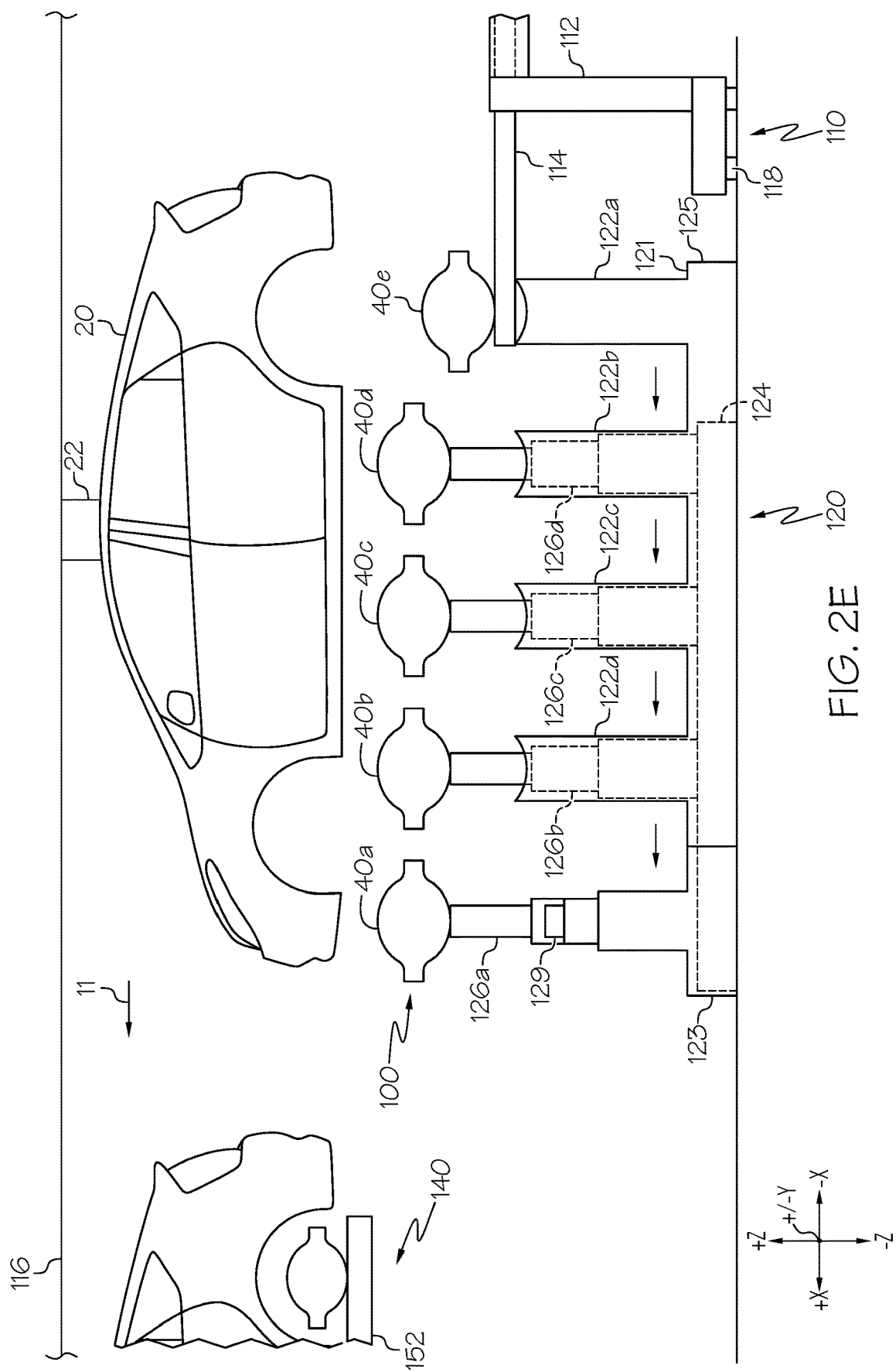
FIG. 2E schematically depicts adding a new RSM to the RSM buffer, according to one or more embodiments shown and described herein.

Referring to FIG. 2E, the transfer portion 123 may be extendable from the stationary portion 125 via an actuator (e.g., electromechanical linear actuator, pneumatic linear actuator, hydraulic linear actuator, or the like). That is, the transfer portion 123 may be configured to move a distance in the main assembly line conveyance direction 11. The transfer portion 123 may be configured to transfer an RSM situated thereon (e.g., RSM 40a), onto the second RSM lifter 140. The transfer portion 123 may include a transfer lifting device 129 configured to lift and/or lower the RSM (e.g., RSM 40a) situated thereon in the Z-direction of the depicted coordinate axes. Referring again to FIG. 2B, the transfer portion 123 may include a first lifting arm 129a and a second transfer arm 129b. The first and second transfer arms may be space from one another to allow the shuttle 124 to pass between the first and second lifting arms 129a, 129b, to allow the shuttle 124 to deposit an RSM onto the first and second lifting arms 129a, 129b. For example, the transfer lifting device 129 may include an actuator (not shown) communicatively coupled to the control unit 101, such that the control unit 101 can control a lifting and lowering operation of the transfer lifting arms 129a, 129b. Such actuators may include, but are not limited to, electromechanical linear actuators, pneumatic linear actuators, hydraulic linear actuators, or the like.

The shuttle 124 may be configured to move along the shuttle frame 121 in the +/−X direction of the depicted coordinate axes to shift the RSMs (e.g., RSM 40a, 40b, 40c, and 40d) between resting positions 122 (e.g., resting positions 122a, 122b, 122c, and 122d) of the stationary portion 125 and to the transfer lifting device 129 of the transfer portion 123. For example, and with reference to FIG. 2B, the shuttle may move in the +/−X direction between the first support side 127a and the second support side 127b of the plurality of resting positions. The shuttle 124 may be moved along the shuttle frame 121 via one or more actuators (e.g., electromechanical linear actuators, pneumatic linear actuators, hydraulic linear actuators, or the like (not shown). That is, the control unit 101 may be communicatively coupled to the one or more actuators of the shuttle 124 to cause the shuttle 124 to traverse the shuttle frame 121 along the X-direction of the depicted coordinate axes.

Coupled to the shuttle 124 may be one or more lifting arms 126. The one or more lifting arms 126 may include a plurality of separate lifting arms or one integral lifting arm. In embodiments, the number of lifting arms 126 may be equal to the number of resting positions 122 of the stationary portion 125. For example, the shuttle 124 may include a first lifting arm 126a, a second lifting arm 126b, a third lifting arm 126c, and a fourth lifting arm 126d. The one or more lifting arms 126 may be coupled to one or more lifting actuators (not shown) configured to move the one or more lifting arms 126 between a transport orientation and a resting orientation. When in the transport orientation, the one or more lifting arms 126 may be extended in the +Z direction of the depicted coordinate axes to lift the RSM (e.g., RSM 40a-40d) positioned thereabove in the +Z direction and out of contact with the shuttle frame 121, as illustrated in FIG. 2C. In the resting orientation, the one or more lifting arms 126 may be retracted in the −Z direction of the depicted coordinate axes such that the RSM 40 rests on first support side 127a and the second support side of the plurality of resting positions 126 of the shuttle frame 121, as illustrated in FIG. 2B. The one or more lifting arms 126 may include to one or more lifting actuators (not shown) to facilitate lifting and lowering of the one or more lifting arms 126 to the transport orientation and the resting orientation. The one or more lifting actuators may be communicatively coupled to the control unit 101 to allow the control unit 101 to control the lifting and lowering of the one or more lifting arms 126. Such actuators may include, but are not limited to, electromechanical linear actuators, pneumatic linear actuators, hydraulic linear actuators, or the like.

Once in the transport orientation, as illustrated in FIG. 2C-2E, the control unit 101 may control the shuttle 124 to move the shuttle 124 along the shuttle frame 121, thereby shifting the RSM(s) (e.g., 40a, 40b, 40c, and 4d) supported on the one or more lifting arms 126 to a subsequent resting position or to the transfer lifting device 129. For example, once an RSM has been transferred through the plurality of resting positions 122, the RSM may be transferred by the shuttle 124 and the one or more lifting arms 126 to the transfer portion 123 of the shuttle frame 121.

The second RSM lifter 140 may be substantially similar to the first RSM lifter 110. For example, the second RSM lifter 140 may include a second RSM lifter arm 152, a second RSM lifter body 154, and a second RSM lifter 140 base 116. The second RSM lifter 140 may be configured to move in synchronization with the main assembly line 12 during installation of an RSM 40 to a vehicle 20. For example, the second RSM lifter 140 may move along a track with motorized wheels in synchronization with the movement of the main assembly line 12. Once installation is finished, the second RSM lifter 140 may be moved back toward the RSM buffer 120 to receive a subsequent RSM from the RSM buffer 120.

Figure 2F:
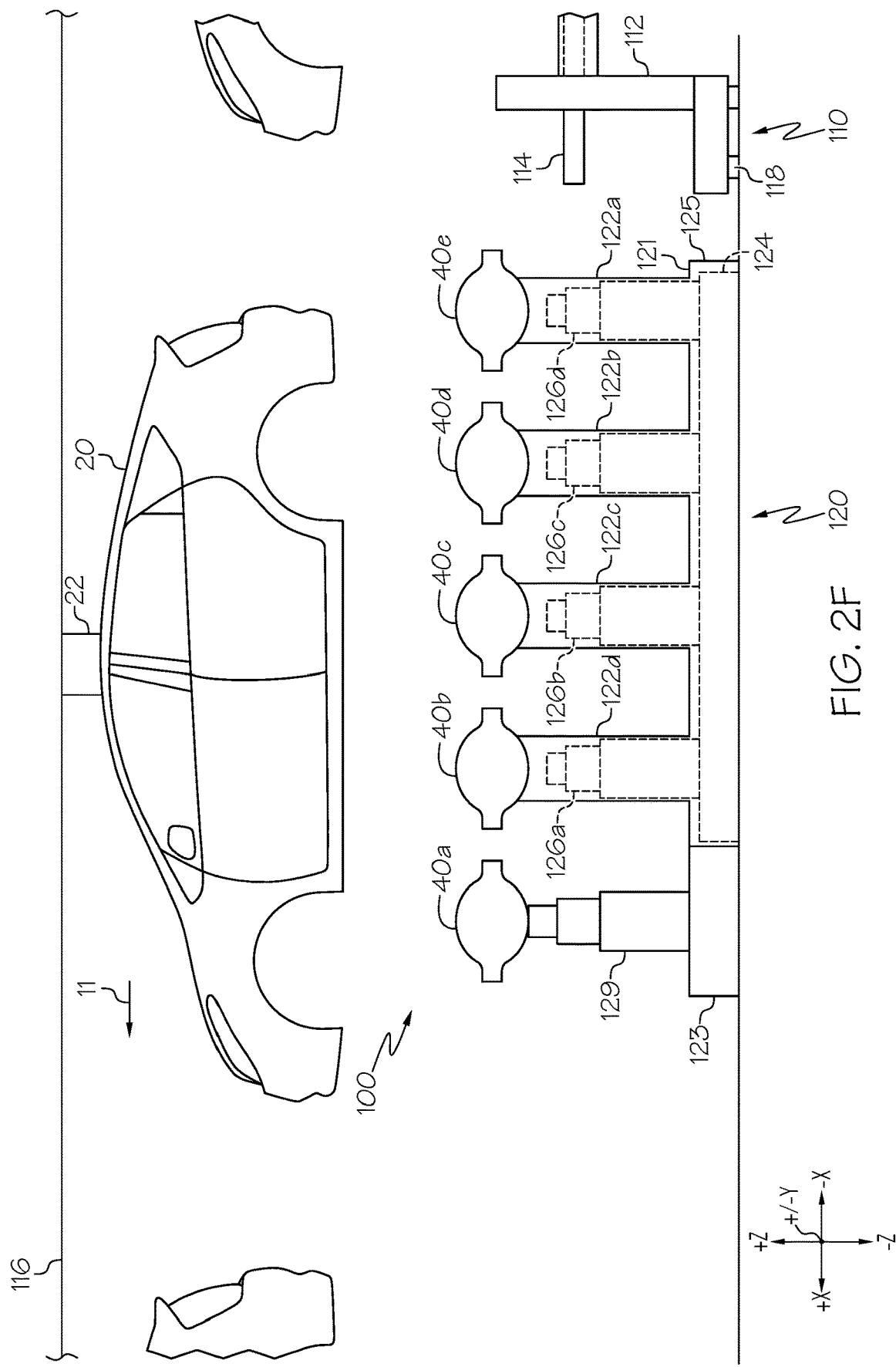
FIG. 2F schematically depicts the plurality of lifting arms returning to a resting position, according to one or more embodiments shown and described herein.

For example, the second RSM lifter 140 may receive or retrieve an RSM 40*a* from the transfer portion 123 of the RSM buffer 120. The transfer portion 123 may move in the +X direction of the depicted coordinate axes with the RSM 40*a* supported thereon in a raised position. The second RSM lifter arm 152 may be positioned under the RSM 40*a* such that the transfer lifting device 129 may lower and rest the RSM 40*a* on the waiting second RSM lifter arm 152, as illustrated in FIG. 2F. The second RSM lifter body 154 of the second RSM lifter 140 may include an actuator (not shown) configured to lift and lower the second RSM lifter arm 152. The actuator may be communicatively coupled to the control unit 101 such that the control unit 101 controls the motion of the second RSM lifter arm 152. The actuator may include, but is not limited to, electromechanical linear actuators, pneumatic linear actuators, hydraulic linear actuators, or the like.

Figure 2G:
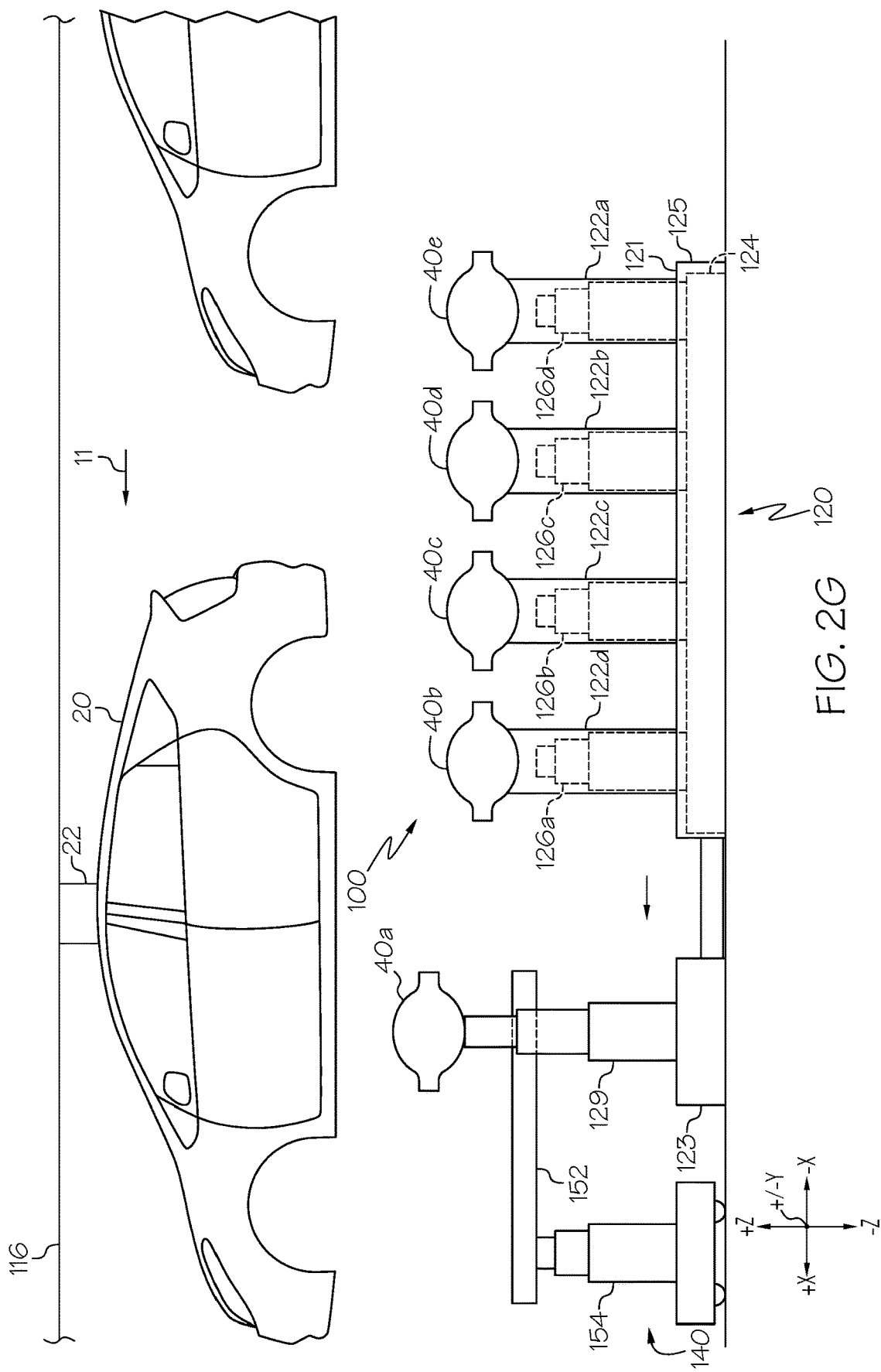
FIG. 2G depicts an RSM transfer of the RSM Buffer transferring an RSM to a second RSM lifter, according to one or more embodiments shown and described herein.

As illustrated in FIG. 2G, the second RSM lifter arm 152 may raise the RSM 40*a* and align the RSM 40*a* within an awaiting vehicle 20. For example, the second RSM lifter 140 may align the RSM 40*a* to one or more guide pins (e.g., 4 guide pins (not shown)) for alignment to various RSM mounts and bushings for coupling the RSM 40*a* to the vehicle 20. As noted above, the second RSM lifter 140 may move in synchronization with the main assembly line 12 during installation of the RSM 40*a* to the vehicle 20. Once installation is complete, the second RSM lifter 140 may return to retrieve a subsequent RSM (e.g., 40*b*, 40*c*, 40*d*, 40*e*, etc.) from the RSM buffer 120.

A method of transporting an RSM from the sub-assembly line 14 to the main assembly line 12 will now be discussed in further detail with specific reference to FIGS. 2A-2I. To begin, an RSM 40*e* may be retrieved from the sub-assembly line 14 with the first RSM lifter 110 and transported to the main assembly line 12, as described above with respect to FIG. 1. As depicted in FIG. 2A, the first RSM lifter 110 is illustrated as supporting an RSM 40*e* for placement onto the RSM buffer 120. While the first RSM lifter 110 is illustrated as "waiting" to deposit the RSM 40*e* onto the first resting position 122*a*, the RSM buffer 120 may be simultaneously shifting, with the shuttle 124 as described above, currently supported RSMs (e.g., RSM 40*a*, 40*b*, 40*c*, and 40*d*) to subsequent resting positions (e.g., from resting position 122*a* to resting position 122*b* and so forth) or to the transfer portion 123 (e.g., from resting position 122*d* to the transfer position 123) of the RSM buffer 120 while the first RSM lifter 110 is retrieving and transporting the RSM 40 from the sub-assembly line 14.

As illustrated in FIG. 2C-2E, the one or more lifting arms 126 of the shuttle 124 may be raised to lift the RSMs 40*a*, 40*b*, 40*c*, and 40*d* from the resting positions 122*d*, 122*c*, 122*b*, and 122*a* to the transport orientation. When in the transport orientation, the shuttle 124 and the one or more lifting arms (e.g., 126*a-d*) may be shifted forward in the +X direction of the depicted coordinate axes, such that the first lifting arm 126*a* positions the first RSM 40*a* over the transfer lifting device 129, the second lifting arm 126*b* positions the second RSM 40*b* over the fourth resting position 122*d*, the third lifting arm 126*c* positions the third RSM 40*c* over the third resting position 122*c*, and the fourth lifting arm 126*d* positions the fourth RSM 40*d* over the second resting position 122*b*. At this point the one or more lifting arms 126 may lower to the resting orientation to cause the RSMs 40*b*-40*d* to be positioned on the second through fourth resting positions 122*b*-122*d* and for RSM 40*a* to be supported on the transfer lifting device 129, as illustrated in FIG. 2F.

As the RSMs 40*a*-40*d* are being shifted and deposited on their new resting positions, the rotatable arm 114 of the first RSM lifter 110 may be extended over the first resting position 122*a* and deposit RSM 40*e* thereon, as illustrated in FIGS. 2D and 2E. At such point, an RSM may be positioned on each resting position and on the transfer portion 123 of the RSM buffer 120. Accordingly, five RSMs may be aligned and ready for mounting on a vehicle 20 traveling along the main assembly line 12. As noted above, there may be a fewer or greater number of resting positions 122. Accordingly, the number of RSMs that are positioned on the RSM buffer 120 at any one time may vary accordingly.

Figure 2H:
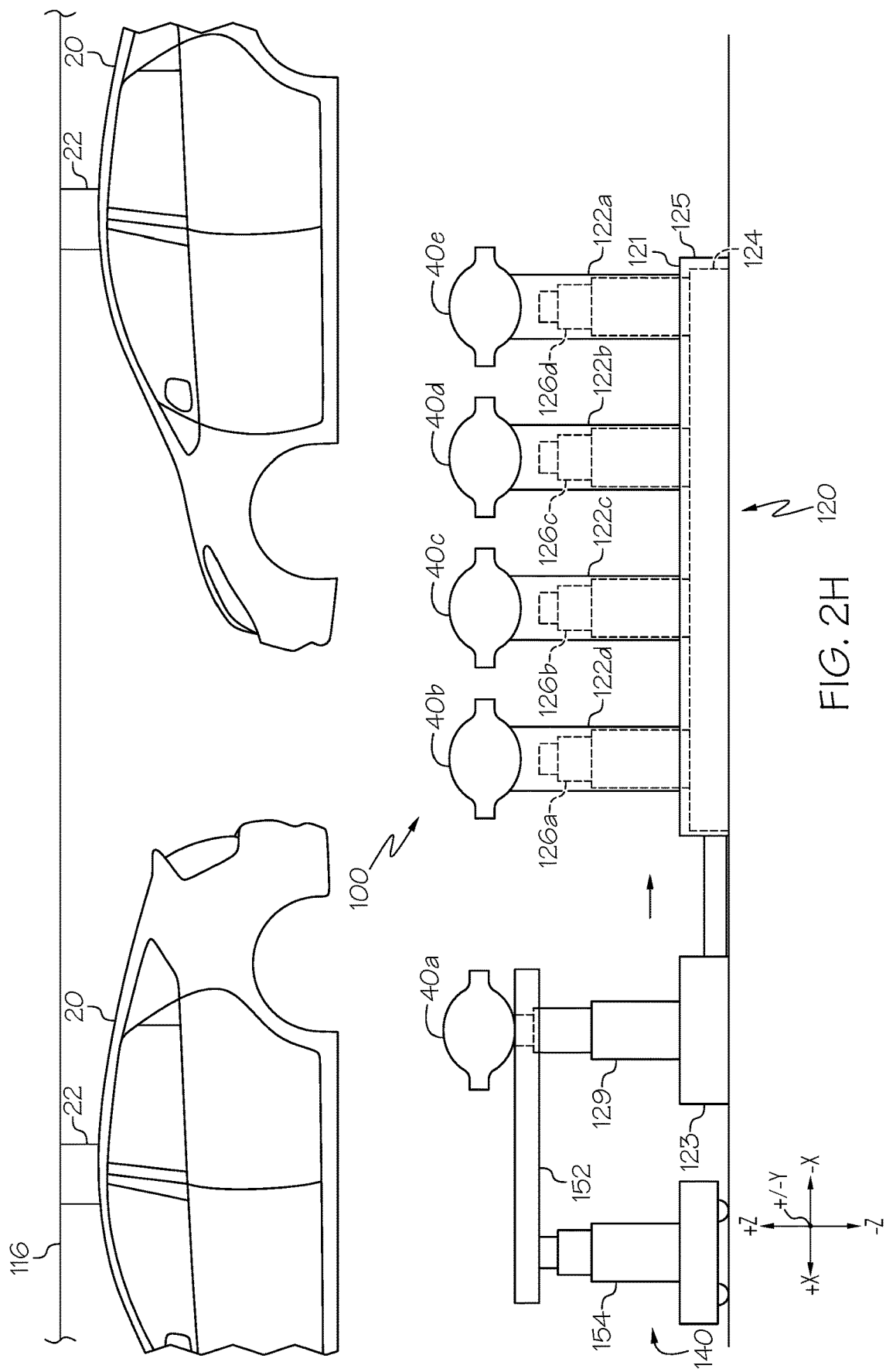
FIG. 2H depicts the RSM transfer lowering the RSM onto the second RSM lifter, according to one or more embodiments shown and described herein.
Figure 21:
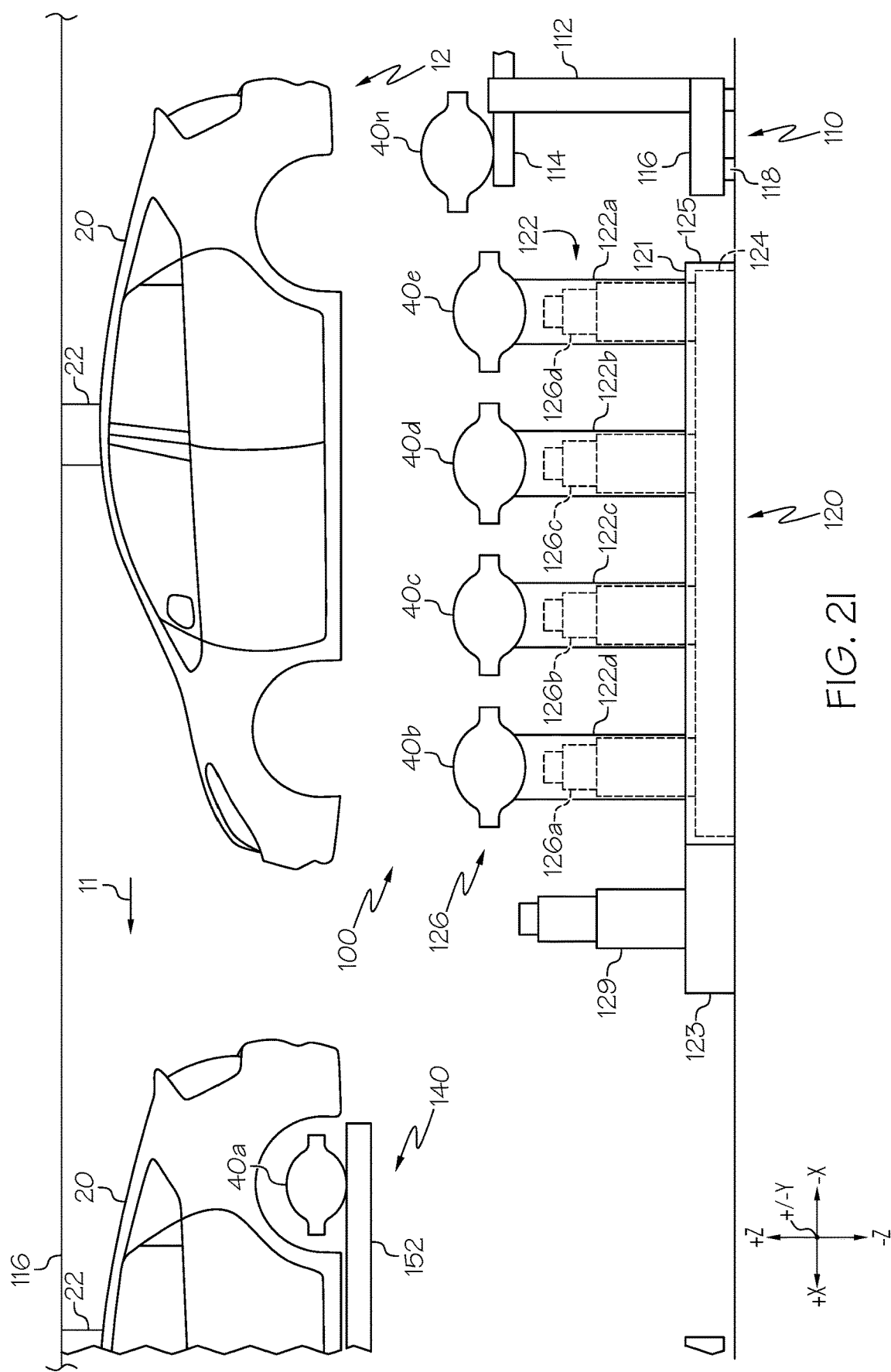

As illustrated in FIG. 2G, the transfer lifting device 129 may lift the RSM 40*a* in the +Z-direction of the depicted coordinate axes, which may allow the second RSM lifter 140 to be positioned beneath RSM 40*a*, such that retraction of the transfer lifting device 129 in the −Z-direction allows the RSM 40*a* to be deposited on the second RSM lifter arm 152, as illustrated in FIG. 2H. As described above, the second RSM lifting arm 152 may move in the +X-direction in synchronization with the main assembly line 12 while lifting the RSM 40*a* into position for mounting of the RSM 40*a* within the vehicle 20, as illustrated in FIG. 2I. Meanwhile, the first RSM lifter 110 may return to the sub-assembly line 14 to retrieve a subsequent RSM 40*n* for positioning on the RSM buffer 120.

It is noted that in some embodiments, the RSM transfer assembly 100 may include one or more sensors (not shown) communicatively coupled to the control unit 101. The one or more sensors may be any sensor(s), which outputs a signal of an RSM being positioned for transfer from the sub-assembly line 14, from the first RSM lifter 110, and or through the RSM buffer 120. For example, a weight sensor or the like may be positioned along the sub-assembly line 14, such that a weight of an RSM 40 being positioned thereon triggers the control unit 101 to retrieve the RSM 40 from the sub-assembly line 14. Similarly, a weight sensor coupled to the plurality of resting positions 122, may indicate that an RSM is positioned at any of the resting positions 122, to cause the control unit 101 to shift the RSM 40 situated thereon through the plurality of resting positions 122 to eventually transfer the RSM 40 to the second RSM lifter 140.

It should now be understood that RSM transfer assemblies as described herein may include a first RSM lifter, an RSM buffer, and a second RSM lifter. The first RSM lifter may be configured to travel laterally between the sub-assembly line and the main assembly line. The first RSM lifter may include a lifting body and a rotatable arm configured to retrieve an RSM from the sub-assembly line and transport the RSM to the main assembly line. The RSM buffer may be configured to receive the RSM from the first RSM lifter and transport the RSM through a plurality of resting positions. The second RSM lifter is configured to receive the RSM from the RSM buffer and raise the RSM into position for installation on a vehicle. The RSM transfer assembly may allow continuous assembly of an RSM to a passing vehicle body due to the store of the RSMs maintained on the RSM buffer. Accordingly, downtime due to awaiting retrieval of an RSM from the sub-assembly line may be avoided.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A rear suspension member (RSM) transfer assembly for transferring an RSM from a sub-assembly line to a main assembly line, the RSM transfer assembly comprising:
   a first RSM lifter configured to travel laterally between the sub-assembly line and the main assembly line, the first RSM lifter comprising a lifting body and a rotatable arm configured to retrieve the RSM from the sub-assembly line and transport the RSM to the main assembly line;
   an RSM buffer configured to receive the RSM from the first RSM lifter and transport the RSM through a plurality of resting positions; and
   a second RSM lifter configured to receive the RSM from the RSM buffer and raise the RSM into position for installation on a vehicle.

2. The RSM transfer assembly of claim 1, further comprising a lateral motion track extending between the main assembly line and the sub-assembly line, wherein the first RSM lifter is configured to traverse the lateral motion track.

3. The RSM transfer assembly of claim 1, wherein the RSM buffer comprises:
   a shuttle frame;
   a shuttle moveable along the shuttle frame; and
   one or more lifting arms coupled to the shuttle, the one or more lifting arms being extendable to a transport orientation and retractable to a resting orientation.

4. The RSM transfer assembly of claim 3, wherein, when positioned on the RSM buffer, the RSM is supported by a lifting arm of the one or more lifting arms of the RSM buffer in the transport orientation, and the RSM is support by the shuttle frame when the one or more lifting arms are positioned in the resting orientation.

5. The RSM transfer assembly of claim 3, where the shuttle frame comprises a transfer portion and a stationary portion, wherein the transfer portion is moveable in a direction of a main assembly conveyance direction relative to the stationary portion.

6. The RSM transfer assembly of claim 5, wherein the transfer portion transfers the RSM to the second RSM lifter.

7. A method of transporting a rear suspension member (RSM) from a sub-assembly line to a main assembly line, the method comprising:
   retrieving the RSM from the sub-assembly line with a first RSM lifter;
   transporting the RSM with the first RSM lifter to an RSM buffer;
   transporting the RSM through a plurality of resting positions with the RSM buffer;
   receiving the RSM from the RSM buffer with a second RSM lifter; and
   lifting the RSM with the second RSM lifter into position for installation on a vehicle.

8. The method of claim 7 further comprising:
   transporting a vehicle along an overhead conveyor in a main assembly line conveyance direction, wherein the RSM buffer is positioned below the overhead conveyor and moves the RSM through the plurality of resting positions along the main assembly line conveyance direction.

9. The method of claim 7, wherein transporting the RSM with the first RSM lifter to the RSM buffer comprising traversing a lateral motion track with the first RSM lifter from the sub-assembly line to the main assembly line.

10. The method of claim 7, wherein the RSM buffer comprises:
    a shuttle frame;
    a shuttle moveable along the shuttle frame; and
    one or more lifting arms coupled to the shuttle, the one or more of lifting arms being extendable to a transport orientation and retractable to a resting orientation.

11. The method of claim 10, wherein transporting the RSM through the plurality of resting positions with the RSM buffer comprises:
    resting the RSM on the shuttle frame in a first resting position; and
    lifting the RSM with one of the one or more lifting arms coupled to the shuttle above the shuttle frame;
    sliding the shuttle relative to the shuttle frame to transport the RSM in a main assembly line conveyance direction; and
    lowering the RSM with the one of the one or more lifting arms to a second resting position.

12. The method of claim 10, where the shuttle frame comprises a transfer portion and a stationary portion, wherein the transfer portion is moveable in a direction of a main assembly conveyance direction relative to the stationary portion.

13. The method of claim 12, further comprising, transferring the RSM from the RSM buffer to the second RSM lifter with the transfer portion.

14. The method of claim 12, wherein the RSM buffer defines four resting positions.

* * * * *

UNITED STATES PATENT AND TRADEMARK OFFICE
CERTIFICATE OF CORRECTION

| | |
|---|---|
| PATENT NO. | : 11,352,209 B2 |
| APPLICATION NO. | : 16/455861 |
| DATED | : June 7, 2022 |
| INVENTOR(S) | : Ronald Scott Friend, Robert Aaron Allex and Brian McElroy |

It is certified that error appears in the above-identified patent and that said Letters Patent is hereby corrected as shown below:

In the Specification

In Column 02, Line(s) 04, before "plan", delete "an" and insert --a--, therefor.

In the Claims

In Column 09, Line(s) 47, Claim 5, delete "where" and insert --wherein--, therefor.

In Column 10, Line(s) 43, Claim 12, delete "where" and insert --wherein--, therefor.

Signed and Sealed this
Thirtieth Day of August, 2022

*Katherine Kelly Vidal*

Katherine Kelly Vidal
*Director of the United States Patent and Trademark Office*